United States Patent
Kim et al.

(10) Patent No.: US 9,660,302 B2
(45) Date of Patent: May 23, 2017

(54) SECONDARY BATTERY PACK HAVING NON-PROTRUDED CONNECTOR

(71) Applicant: LG CHEM, LTD., Seoul (KR)

(72) Inventors: Tae Wook Kim, Daejeon (KR); Hyung Ku Yun, Daejeon (KR); Dong Cheol Lee, Daejeon (KR); Ho Chol Nam, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/761,355

(22) PCT Filed: May 22, 2014

(86) PCT No.: PCT/KR2014/004563
§ 371 (c)(1),
(2) Date: Jul. 16, 2015

(87) PCT Pub. No.: WO2014/189299
PCT Pub. Date: Nov. 27, 2014

(65) Prior Publication Data
US 2016/0072154 A1   Mar. 10, 2016

(30) Foreign Application Priority Data
May 23, 2013  (KR) .................. 10-2013-0058099

(51) Int. Cl.
*H01M 2/26* (2006.01)
*H01M 10/42* (2006.01)
(Continued)

(52) U.S. Cl.
CPC ......... *H01M 10/425* (2013.01); *H01M 2/021* (2013.01); *H01M 2/0267* (2013.01);
(Continued)

(58) Field of Classification Search
CPC ........... H01M 10/0436; H01M 10/425; H01M 2200/00; H01M 2200/103;
(Continued)

(56) References Cited

U.S. PATENT DOCUMENTS 6,225,778 B1 * 5/2001 Hayama ............ H01M 2/1061
320/112
8,115,455 B2   2/2012 Sellin et al.
(Continued)

FOREIGN PATENT DOCUMENTS

EP   2 207 222 A1   7/2010
EP   2506338 A1   10/2012
(Continued)

OTHER PUBLICATIONS

International Search Report issued in PCT/KR2014/004563, mailed on Aug. 22, 2014.
(Continued)

*Primary Examiner* — Patrick Ryan
*Assistant Examiner* — Ben Lewis
(74) *Attorney, Agent, or Firm* — Birch, Stewart, Kolasch & Birch, LLP

(57) ABSTRACT

Disclosed herein is a secondary battery pack including a battery cell having a cathode terminal and an anode terminal formed on one surface including a sealed portion to seal the battery cell and a protection circuit module (PCM) including a protection circuit board (PCB) having a protection circuit formed thereon, an external input and output terminal electrically connected to the protection circuit, a connector electrically connected to the external input and output terminal, and an electrically insulative PCM case in which the PCB is mounted, wherein the PCM is loaded on the sealed portion in a state in which the PCM is electrically connected to the battery cell and the connector is formed on the PCM (Continued)

such that the connector does not protrude outward from the secondary battery pack.

18 Claims, 5 Drawing Sheets

(51) Int. Cl.
*H01M 2/10* (2006.01)
*H01M 2/02* (2006.01)
*H01M 2/34* (2006.01)
*H01M 10/04* (2006.01)

(52) U.S. Cl.
CPC ....... *H01M 2/0287* (2013.01); *H01M 2/1061* (2013.01); *H01M 2/348* (2013.01); *H01M 2/026* (2013.01); *H01M 10/0436* (2013.01); *H01M 2200/00* (2013.01); *H01M 2200/103* (2013.01); *H01M 2200/106* (2013.01); *H01M 2220/30* (2013.01)

(58) Field of Classification Search
CPC ....... H01M 2200/106; H01M 2220/30; H01M 2/021; H01M 2/026; H01M 2/0267; H01M 2/0287; H01M 2/1061; H01M 2/348

See application file for complete search history.

(56) References Cited

U.S. PATENT DOCUMENTS

| 8,174,237 | B2 | 5/2012 | Kosugi et al. |
| 2005/0208346 | A1 | 9/2005 | Moon et al. |
| 2007/0264535 | A1* | 11/2007 | Lee .................... H01M 2/0207 429/7 |
| 2010/0136373 | A1 | 6/2010 | Jang et al. |
| 2010/0244772 | A1 | 9/2010 | Chan et al. |
| 2011/0104527 | A1* | 5/2011 | Choi ..................... H01M 2/024 429/53 |
| 2013/0034752 | A1 | 2/2013 | Choi et al. |
| 2014/0141289 | A1 | 5/2014 | Choi et al. |
| 2014/0147706 | A1 | 5/2014 | Choi et al. |

FOREIGN PATENT DOCUMENTS

| JP | 2004-171895 A | 6/2004 |
| JP | 2004-171896 A | 6/2004 |
| JP | 2013-38065 A | 2/2013 |
| KR | 10-2007-0099067 A | 10/2007 |
| KR | 10-2013-0016086 A | 2/2013 |
| KR | 10-2013-0018478 A | 2/2013 |
| TW | I257728 B | 7/2006 |
| TW | M354187 U1 | 4/2009 |
| TW | 201308726 A1 | 2/2013 |
| WO | WO 2012/098202 A2 | 7/2012 |
| WO | WO 2013/022210 A2 | 2/2013 |

OTHER PUBLICATIONS

European Search Report issued in Application No. 14 800 504.4, mailed on Jan. 9, 2017.

* cited by examiner

10

100

500

SECONDARY BATTERY PACK HAVING NON-PROTRUDED CONNECTOR

TECHNICAL FIELD

The present invention relates to a secondary battery pack including a non protruding connector and, more particularly, to a secondary battery pack including a battery cell having a cathode terminal and an anode terminal formed on one surface including a sealed portion to seal the battery cell and a protection circuit module (PCM) including a protection circuit board (PCB) having a protection circuit formed thereon, an external input and output terminal electrically connected to the protection circuit, a connector electrically connected to the external input and output terminal, and an electrically insulative PCM case in which the PCB is mounted, wherein the PCM is loaded on the sealed portion in a state in which the PCM is electrically connected to the battery cell and the connector is formed on the PCM such that the connector does not protrude outward from the secondary battery pack.

BACKGROUND ART

As mobile devices have been increasingly developed, and the demand for such mobile devices has increased, the demand for secondary batteries has also sharply increased. Among such secondary batteries is a lithium secondary battery exhibiting high energy density and operating voltage and excellent charge retention and service-life characteristics, which has been widely used as an energy source for various electronic products as well as various kinds of mobile devices.

Depending upon the types of devices in which secondary batteries are used, the secondary batteries may be configured to have a detachable type structure in which the secondary batteries can be easily inserted into and removed from the devices or an embedded type structure in which the secondary batteries are embedded in the devices. For example, secondary batteries used in conventional mobile devices may be configured to have a detachable type structure in which the secondary batteries can be inserted into or removed from the mobile devices as needed. On the other hand, secondary batteries used in other devices, such as some mobile phones, tablet personal computers (PCs), and smart pads, may be configured to have an embedded type structure.

Among such secondary batteries is a lithium secondary battery, which is widely used. A secondary battery includes anode and cathode terminals electrically connected to a device in which the secondary battery is mounted and a safety element to effectively control an abnormal state of the secondary battery, such as overcharge of the secondary battery or overcurrent in the secondary battery. Examples of the safety element may include a positive temperature coefficient (PTC) element and a protection circuit module (PCM).

In general, an embedded type secondary battery pack uses a plate-shaped battery cell, which is suitable for electrical connection, and a safety element, such as a PCM, is connected to a battery cell including anode and cathode terminals via a conductive nickel plate by welding or soldering. The anode and cathode terminals contact anode and cathode terminal parts of the PCM such that the anode and cathode terminals are electrically connected to an external input and output terminal formed at the PCM. A connector is electrically connected to the external input and output terminal.

In a conventional secondary battery pack, the connector is connected to a device in a state in which the connector protrudes outward from the battery pack. For this reason, it is necessary to provide the interior of the device with an additional space in which the connector will be located although a space necessary to form the connector is present in the battery pack.

In addition, an expensive flexible board is used to interconnect the connector protruding outward from the battery pack and the PCM. As a result, manufacturing cost is increased.

Therefore, there is a high necessity for a secondary battery pack, from which a protruding connector is removed to improve spatial efficiency and to reduce manufacturing cost.

DISCLOSURE

Technical Problem

Therefore, the present invention has been made to solve the above problems, and other technical problems that have yet to be resolved.

Specifically, it is an object of the present invention to provide a secondary battery pack configured to have a structure in which a connector is formed on a protection circuit module (PCM) such that the connector does not protrude outward from the secondary battery pack, thereby preventing generation of a dead space in a device, in which the secondary battery pack is mounted, due to the connector and reducing manufacturing cost.

Technical Solution

In accordance with one aspect of the present invention, the above and other objects can be accomplished by the provision of a secondary battery pack including a battery cell having a cathode terminal and an anode terminal formed on one surface including a sealed portion to seal the battery cell and a protection circuit module (PCM) including a protection circuit board (PCB) having a protection circuit formed thereon, an external input and output terminal electrically connected to the protection circuit, a connector electrically connected to the external input and output terminal, and an electrically insulative PCM case in which the PCB is mounted, wherein the PCM is loaded on the sealed portion in a state in which the PCM is electrically connected to the battery cell and the connector is formed on the PCM such that the connector does not protrude outward from the secondary battery pack.

As described above, the secondary battery pack according to the present invention is configured to have a structure in which the connector is formed on the PCM such that the connector does not protrude outward from the battery pack. Consequently, it is possible to minimize a space defined in a device, in which the connector will be mounted. In addition, a flexible board extending between the PCM and the connector is removed. Consequently, it is possible to reduce manufacturing cost.

In a preferred example, the cathode terminal and the anode terminal of the battery cell may be electrically connected to the PCB and the external input and output terminal may be formed on the PCB such that the external input and output terminal is electrically connected to the cathode terminal and the anode terminal of the battery cell.

For example, the connector may be directly coupled to the external input and output terminal without using an additional member, thereby achieving electrical connection from the cathode terminal and the anode terminal of the battery cell to the connector via the PCB and the external input and output terminal.

Unlike the structure in which the connector is directly coupled to the external input and output terminal as described above, an electrical connection member may be interposed between the external input and output terminal and the connector to achieve electrical connection between the external input and output terminal and the connector.

In this case, the electrical connection member may be a flexible printed circuit board (FPCB). However, the present invention is not limited thereto. Even in this case, the connector is disposed on the PCM such that the connector does not protrude outward from the secondary battery pack. Consequently, this structure is differentiated from a conventional structure.

In a concrete example, the PCM case may be provided with an opening, through which the connector is exposed outward.

Specifically, the PCM case may include a first case member and a second case member coupled to each other while surrounding the PCB.

The second case member may be configured to have a box structure open at one surface thereof such that the PCM is inserted and mounted in the second case member and the first case member may be provided at one side thereof with an opening, through which the connector is exposed.

In a concrete example, the PCB may be provided at one surface thereof with the external input and output terminal and at the other surface thereof with an anode terminal connection part and a cathode terminal connection part corresponding to the anode terminal and the cathode terminal, respectively.

A nickel plate may be further mounted at a top of the cathode terminal to be coupled to the cathode terminal connection part by ultrasonic welding.

A safety element may be further mounted at an electrical connection region between one of the electrode terminals of the battery cell and the PCB.

Specifically, the safety element may be a positive temperature coefficient (PTC) element or a fuse. However, the present invention is not limited thereto.

The secondary battery pack according to the present invention may be configured to have a structure in which a label is attached to the battery cell and the PCM excluding the connector in a wrapping fashion.

Specifically, the label may be configured to have a structure that is capable of wrapping a thermally bonded outer circumferential surface of the battery cell and the PCM excluding the connector.

The battery cell may be a secondary battery having an electrode assembly of a cathode/separator/anode structure received in a battery case made of a laminate sheet comprising a metal layer and a resin layer in a sealed state.

In accordance with another aspect of the present invention, there is provided a protection circuit module (PCM) mounted at a sealed portion of a plate-shaped battery cell having a cathode terminal and an anode terminal, each of which is made of a plate-shaped conductive member, formed at an upper end thereof, the PCM including a PCB having a protection circuit formed thereon, an external input and output terminal electrically connected to the protection circuit, a connector electrically connected to the external input and output terminal, and an electrically insulative PCM case in which the PCB is mounted, wherein the PCB is electrically connected to the cathode terminal and the anode terminal of the battery cell and the connector is mounted at the external input and output terminal such that the connector does not protrude outward from the PCM case.

The connector may be directly coupled to the external input and output terminal. According to circumstances, an electrical connection member may be interposed between the external input and output terminal and the connector to achieve electrical connection between the external input and output terminal and the connector.

The PCM case may be provided with an opening, through which the connector is exposed outward.

In accordance with a further aspect of the present invention, there is provided a device including the secondary battery pack with the above-stated construction.

Examples of the device may include a mobile phone, a mobile computer, a smart phone, a tablet PC, a smart pad, and a netbook computer. The structures and manufacturing methods of the devices are well known in the art to which the present invention pertains and, therefore, a detailed description will be omitted.

BRIEF DESCRIPTION OF DRAWINGS

The above and other objects, features and other advantages of the present invention will be more clearly understood from the following detailed description taken in conjunction with the accompanying drawings, in which.

BEST MODE

Now, exemplary embodiments of the present invention will be described in detail with reference to the accompanying drawings. It should be noted, however, that the scope of the present invention is not limited by the illustrated embodiments.

Figure 1:
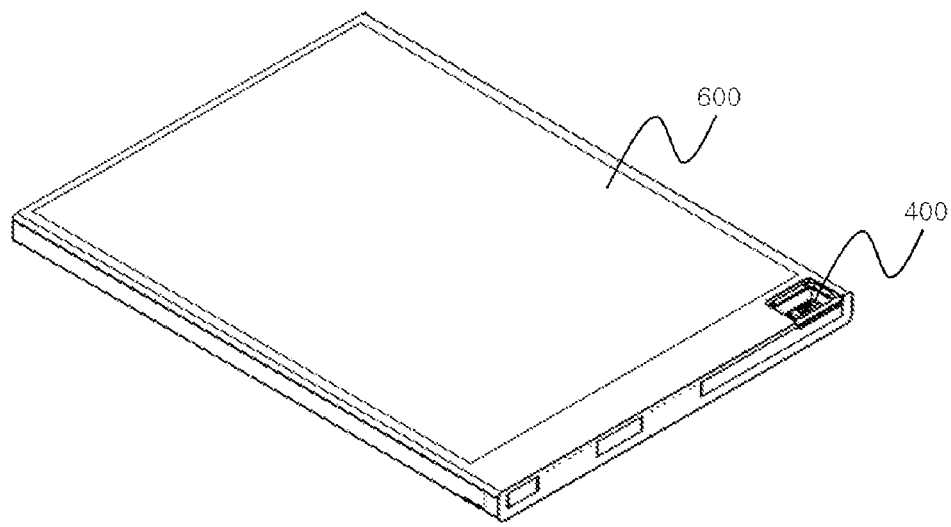
FIG. 1 is a perspective view showing a secondary battery pack according to an embodiment of the present invention.
Figure 2:
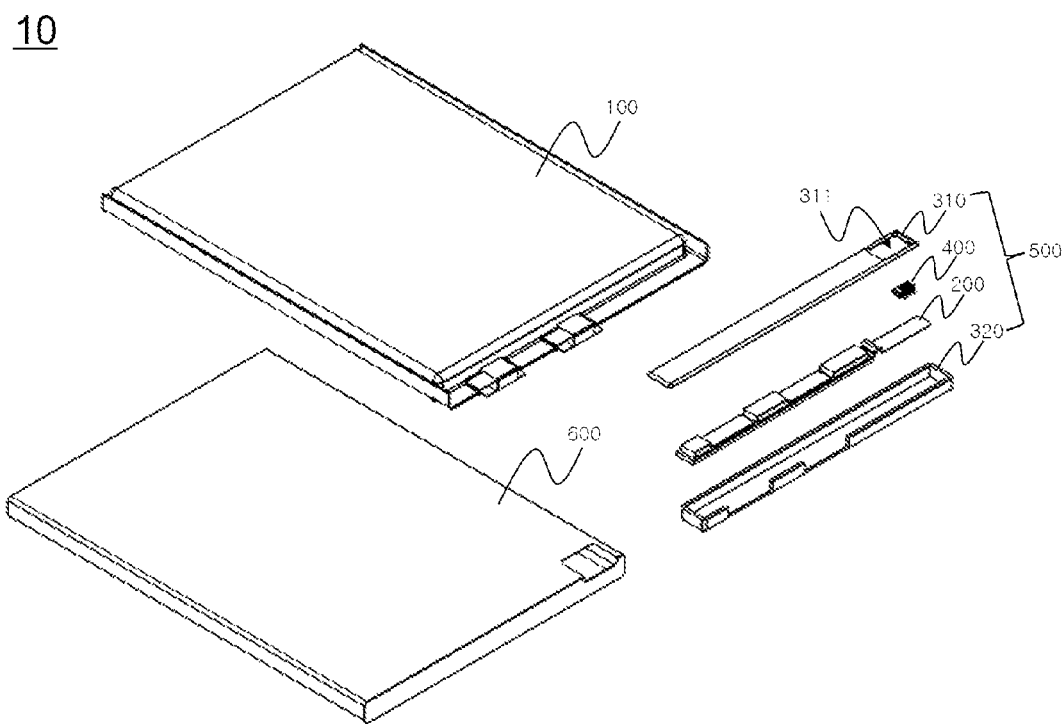
FIG. 2 is an exploded view of the secondary battery pack shown in FIG. 1.

FIG. 1 is a perspective view typically showing a secondary battery pack 10 according to an embodiment of the present invention and FIG. 2 is an exploded view typically showing the secondary battery pack 10 of FIG. 1.

Referring to FIGS. 1 and 2, the secondary battery pack 10 includes a battery cell 100 and a protection circuit module (PCM) 500 including a protection circuit board (PCB) 200, a PCM case 310 and 320, and a connector 400. The secondary battery pack 10 is configured to have a structure in which a label 600 is attached to the battery cell 100 and the PCM 500 excluding the connector 400 in a wrapping fashion and the connector 400 is exposed through an opening 311 of the first case member 310 such that the connector 400 does not protrude outward from the secondary battery pack 10.

Figure 3:
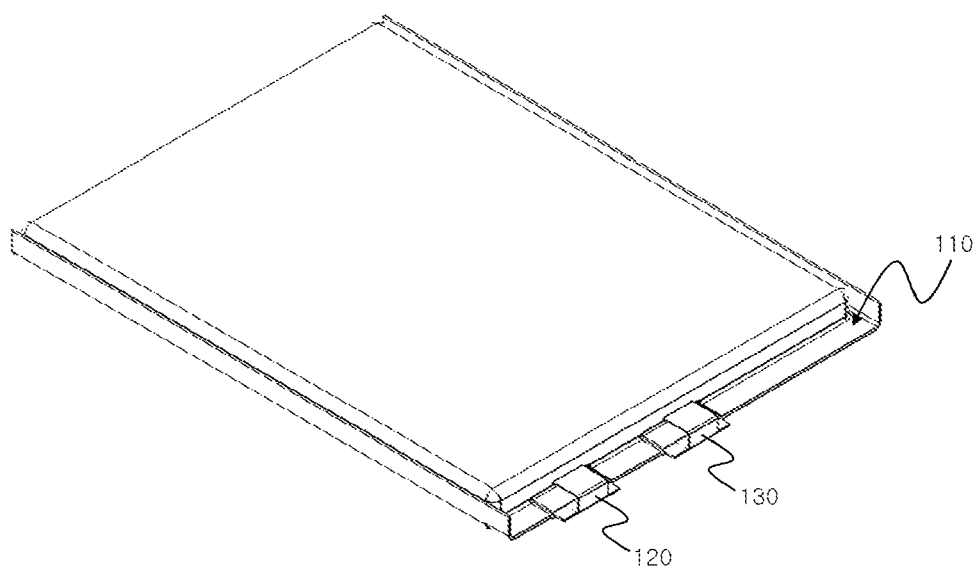
FIG. 3 is a perspective view showing a battery cell according to an embodiment of the present invention.
Figure 4:
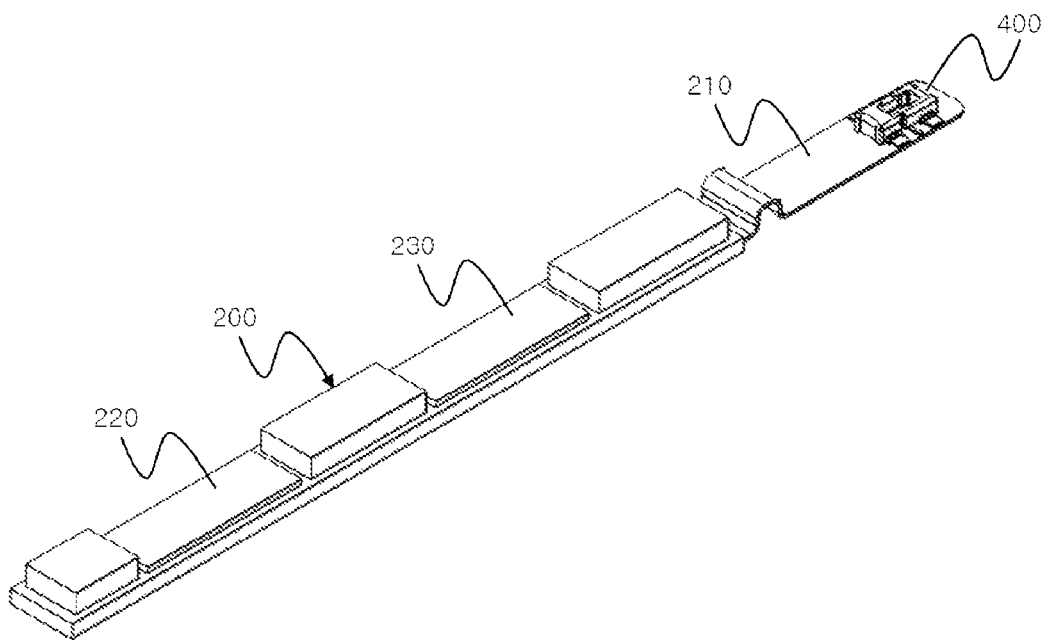
FIG. 4 is a perspective view showing a protection circuit board (PCB), an external input and output terminal, and a connector according to an embodiment of the present invention.
Figure 5:
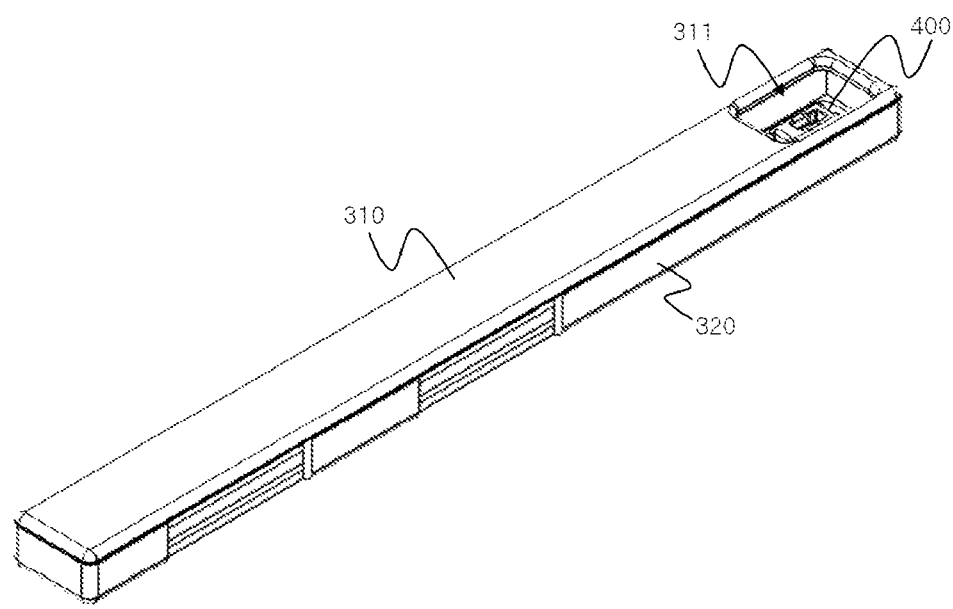
FIG. 5 is a perspective view showing a protection circuit module (PCM) according to an embodiment of the present invention.
Figure 6:
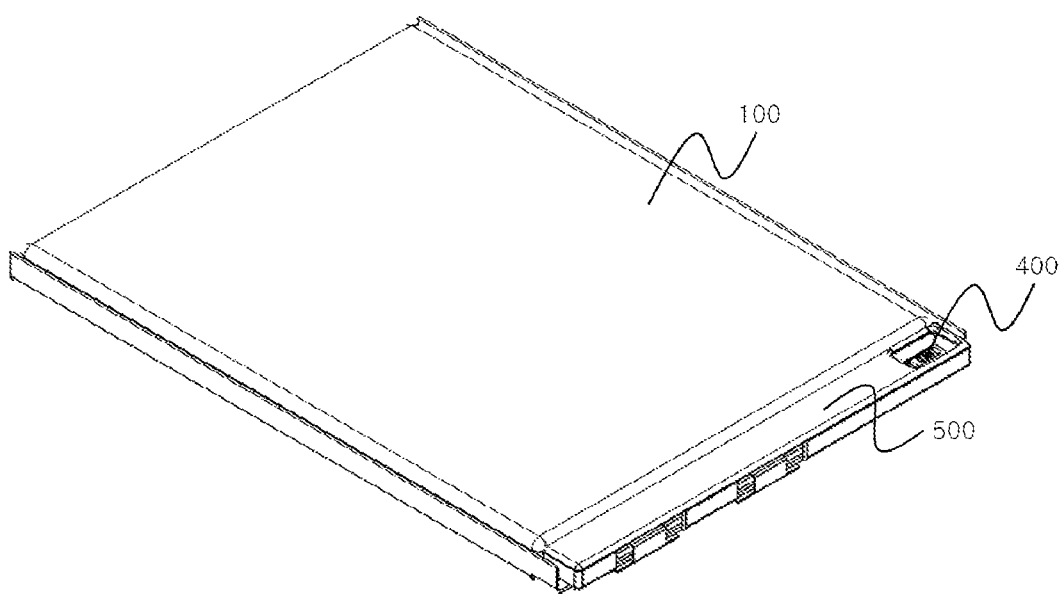
FIG. 6 is a perspective view showing the secondary battery pack of FIG. 1, from which a label is removed.

FIG. 3 is a perspective view typically showing a battery cell according to an embodiment of the present invention, FIG. 4 is a perspective view typically showing a PCB, an external input and output terminal, and a connector according to an embodiment of the present invention, FIG. 5 is a perspective view typically showing a PCM according to an embodiment of the present invention, and FIG. 6 is a perspective view typically showing the secondary battery pack of FIG. 1, from which the label is removed.

Referring to FIGS. 3 to 6 together with FIG. 2, a sealed portion 110 and a cathode terminal 120 and an anode terminal 130 are formed at the upper end of the battery cell 100. A cathode terminal connection part 220 and an anode terminal connection part 230 respectively corresponding to the cathode terminal 120 and the anode terminal 130 are formed at the top of the PCB 200.

The cathode terminal 120 and the anode terminal 130 contact the cathode terminal connection part 220 and the anode terminal connection part 230, respectively, thereby achieving electrical connection between the battery cell 100 and the PCB 200. A safety element (not shown) is further mounted between the anode terminal 130 and the anode terminal connection part 230.

In addition, the cathode terminal connection part 220 and the anode terminal connection part 230 are electrically connected to an external input and output terminal 210. The connector 400 is mounted at the top of the external input and output terminal 210, thereby achieving electrical connection therebetween. An electrical connection member (not shown) may be interposed between the connector 400 and the external input and output terminal 210.

The PCM 500 is configured to have a structure in which the PCB 200 is mounted at the second case member 320 and the first case member 310 is coupled to the upper part of the second case member 320. The opening 311 is formed at the right side of the first case member 310. The connector 400 is exposed through the opening 311 of the first case member 310. The PCM 500 is loaded on the sealed portion of the battery cell 100.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, a secondary battery pack according to the present invention is configured to have a structure in which a connector is formed on a protection circuit module (PCM) such that the connector does not protrude outward from the battery pack. Consequently, it is possible to minimize a space defined in a device, in which the connector will be mounted. In addition, a flexible board extending between the PCM and the connector is removed. Consequently, it is possible to reduce manufacturing cost.

The invention claimed is:

1. An embedded type secondary battery pack comprising:
a battery cell having a cathode terminal and an anode terminal formed on one surface comprising a sealed portion to seal the battery cell; and
a protection circuit module (PCM) comprising:
a protection circuit board (PCB) having a protection circuit formed thereon,
an external input and output terminal electrically connected to the protection circuit,
a connector electrically connected to the external input and output terminal, and
an electrically insulative PCM case in which the PCB is mounted,
wherein the PCM is loaded on the sealed portion in a state in which the PCM is electrically connected to the battery cell, and the connector is formed on the PCM such that the connector does not protrude outward from the secondary battery pack,
wherein the external input and output terminal is formed on the PCB,
wherein the connector is directly coupled to the external input and output terminal,
wherein the PCM case is provided with an opening, through which the connector is exposed outward, and
wherein the PCM case comprises a first case member and a second case member coupled to each other while surrounding the PCB.

2. The secondary battery pack according to claim 1, wherein the second case member is configured to have a box structure open at one surface thereof such that the PCM is inserted and mounted in the second case member, and the first case member is provided at one side thereof with an opening, through which the connector is exposed.

3. The secondary battery pack according to claim 1, wherein the battery cell is a secondary battery having an electrode assembly of a cathode/separator/anode structure received in a battery case made of a laminate sheet comprising a metal layer and a resin layer in a sealed state.

4. The secondary battery pack according to claim 1, wherein the PCB is provided at one surface thereof with the external input and output terminal and at the other surface thereof with an anode terminal connection part and a cathode terminal connection part corresponding to the anode terminal and the cathode terminal, respectively.

5. The secondary battery pack according to claim 4, wherein a nickel plate is further mounted at a top of the cathode terminal to be coupled to the cathode terminal connection part by ultrasonic welding.

6. The secondary battery pack according to claim 1, wherein a safety element is further mounted at an electrical connection region between one of the electrode terminals of the battery cell and the PCB.

7. The secondary battery pack according to claim 6, wherein the safety element is a positive temperature coefficient (PTC) element or a fuse.

8. The secondary battery pack according to claim 1, wherein a label is attached to the battery cell and the PCM excluding the connector in a wrapping fashion.

9. The secondary battery pack according to claim 8, wherein the label is configured to have a structure capable of wrapping a thermally bonded outer circumferential surface of the battery cell and the PCM excluding the connector.

10. A device comprising a secondary battery pack according to claim 1.

11. The secondary battery pack according to claim 1, further comprising a cathode terminal connection part and an anode terminal connection part formed on the PCB, and
wherein the external input and output terminal is located at an end of the board and the cathode terminal connection part is at an opposite end of the board.

12. The secondary battery pack according to claim 1, wherein a width of the PCM case is equal to a width of the battery cell and a length of the PCM case is less than a length of the battery cell.

13. A protection circuit module (PCM) mounted at a sealed portion of a plate-shaped battery cell having a cathode terminal and an anode terminal, each of which is made of a plate-shaped conductive member, formed at an upper end thereof, the PCM comprising:

a PCB having a protection circuit formed thereon;

an external input and output terminal electrically connected to the protection circuit;

a connector electrically connected to the external input and output terminal; and an electrically insulative PCM case in which the PCB is mounted, wherein the PCB is electrically connected to the cathode terminal and the anode terminal of the battery cell, and the connector is mounted at the external input and output terminal such that the connector does not protrude outward from the PCM case.

14. The PCM according to claim 13, wherein the connector is directly coupled to the external input and output terminal.

15. The PCM according to claim 13, wherein an electrical connection member is interposed between the external input and output terminal and the connector.

16. The PCM according to claim 13, wherein the PCM case is provided with an opening, through which the connector is exposed outward.

17. The PCM according to claim 13, further comprising a cathode terminal connection part and an anode terminal connection part formed on the PCB, and wherein the external input and output terminal is located at an end of the board and the cathode terminal connection part is at an opposite end of the board.

18. The secondary battery pack according to claim 13, wherein a width of the PCM case is equal to a width of the battery cell and a length of the PCM case is less than a length of the battery cell.

* * * * *